United States Patent [19]

Yamaguchi et al.

[11] Patent Number: 4,921,187
[45] Date of Patent: May 1, 1990

[54] BAIL INVERTER FOR A SPINNING FISHING REEL AND REEL

[75] Inventors: Nobuyuki Yamaguchi, Tokyo; Akira Yamaguchi, Saitama, both of Japan

[73] Assignee: Daiwa Seiko, Inc., Kurume, Japan

[21] Appl. No.: 272,430

[22] Filed: Nov. 17, 1988

[30] Foreign Application Priority Data

Feb. 5, 1988 [JP] Japan .............................. 63-14392[U]

[51] Int. Cl.$^5$ .............................................. A01K 89/01
[52] U.S. Cl. .................................................... 242/232
[58] Field of Search ................... 242/84.2 G, 84.21 A, 242/230, 231, 232, 233

[56] References Cited

U.S. PATENT DOCUMENTS 4,147,313  4/1979  Sazaki .................................. 242/232
4,256,271  3/1981  Ruin .................................... 242/232

FOREIGN PATENT DOCUMENTS 5589487  4/1977  Japan .

Primary Examiner—Katherine A. Matecki
Attorney, Agent, or Firm—Cushman, Darby & Cushman

[57] ABSTRACT

A bail inverter for a spinning fishing reel in which an operating rod slidable in the longitudinal direction thereof is engaged in a slender opening of a bail support arm which is connected to a bail member, and the bail support member is urged by a spring so that the bail support member remains in a fishline winding position or a fishline unwinding position beyond dead center. The rear end of the operating rod can protrude from the bail support arm. One side portion of the operating rod and the bail support arm are provided with restrictors for restricting the quantity of the protrusion of the operating rod.

2 Claims, 2 Drawing Sheets

BAIL INVERTER FOR A SPINNING FISHING REEL AND REEL

BACKGROUND OF THE INVENTION

The present device relates to a bail inverter for a spinning fishing reel and a reel and more particularly to a bail inverter for a spinning fishing reel which utilizes an operating rod which has a spring which urges the rod to a fishline winding position and a fishline unwinding position.

In conventional bail inverters for spinning fishing reels, an operating rod is urged by a spring and supported slidably in the longitudinal direction thereof so that the operating rod protrudes in a fishline unwinding position. The operating rod is put into contact with a bail inversion cam of a bail support member by a contact member to invert the bail. Such a conventional bail inverter is disclosed in the Japanese Utility Model Application (OPI) No. 55894/77 (the term "OPI" as used herein means an "unexamined published application").

The conventional bail inverter has several problems. Since the bail inversion cam provided on the bail support member is held in a fishline unwinding position through the action of the operating rod against the force of the urging spring, the force which holds the bail inversion cam in the fishline unwinding position is decreased by the force of the urging spring so that the bail is likely to be unexpectedly inverted when the fishing rod is quickly swung down to cast the fishline so that the fishline is cut off.

In addition, sea water, sand, dust or the like clings to the supported portions of the operating rod and the urging spring, particularly to the rear ends of the operating rod and the spring, so that the resistance of the operating rod is increased. Therefore, the smoothness of the inversion of the bail from a fishline unwinding position to a fishline winding position is impaired. Because the restriction of the operating rod in the fishline winding and unwinding positions depends on the urging spring and on the quantity of rotation of the bail inversion cam in the fishline unwinding position, the quantity of rotation of the bail inversion cam changes due to the wear of the rotation restricting portion of the cam if the rotation restricting portion of the cam is provided in the cam and a bail support arm, and the wear of the cam and the rotation restricting portion of the bail support arm if the portion is provided in the arm. The quantity of rotation also depends on the deformation of the easily deformable bail (the deformation is likely to be caused due to the contact of the bail with something, the fall of the bail or the like) or the like so that the quantity of protrusion of the operating rod (which is in contact with the bail inversion cam) from the arm support member changes thereby altering the quantity of contact of the operating rod and the contact member provided in the body of the spinning reel. As a result, good bail inversion performance is not attained.

Further, since the urging spring needs to be provided in the operating rod, it is troublesome to assemble and manufacture the spinning reel. Therefore, the efficiency of the manufacture of the reel is decreased.

SUMMARY OF THE INVENTION

Accordingly, it is an object of the present device to provide a bail inverter for a spinning fishing reel which is simple in constitution and can easily invert and manipulate a bail.

These and other objects are achieved by a bail inverter having bail support members supporting a bail rotatably attached to the front ends of bail support arms provided in mutually opposite positions on a rotor. The bail support members are urged by a spring so that the bail support members are located in fishline winding positions or fishline unwinding positions beyond a dead center. An operating rod, which is moved in conjunction with one of the bail support members, is provided in the corresponding bail support arm so that the operating rod is slidable in the longitudinal direction thereof. The rear end of the operating rod protrudes from the bail support arm when the bail is in a fishline unwinding position, so that the bail is inverted back into a fishline winding position by the contact action of a contact member provided in the body of a spinning reel. In the bail inverter, the front end of the operating rod is engaged in the slender opening of the peripheral portion of the bail support member, and one side portion of the operating rod and the bail support arm are provided with restrictors for restricting the quantity of the protrusion of the operating rod. In one embodiment, the restrictor of the operating rod is a restrictive projection, and the bail support arm has a restrictive recess in which the restrictive projection is engaged. In another embodiment, the restrictor of the operating rod is a restrictive recess, and the bail support arm has a restrictive projection engaged in the restrictive recess. It is preferable that not only the quantity of the protrusion of the operating rod but also the quantity of forward sliding thereof be restricted.

When the bail support members are located in the fishline winding positions by the urging force of the spring, the operating rod is engaged in the slender opening at one end thereof so that the operating rod is slid forward and the rear end thereof is kept non protruding from the bail support arm. When the bail 4 is then inverted into the fishline unwinding position, the operating rod is pushed at the other end of the slender opening so that the rear end of the rod protrudes from that of the bail support arm and the quantity of the protrusion is restricted by the restrictors.

When the rotor is turned to wind a fishline, the protruded rear end of the operating rod is slid forward by the contact member to turn the bail support members beyond the dead center to return the bail support members to the fishline winding positions by the urging force of the spring.

DESCRIPTION OF THE PREFERRED EMBODIMENT

Figure 1:
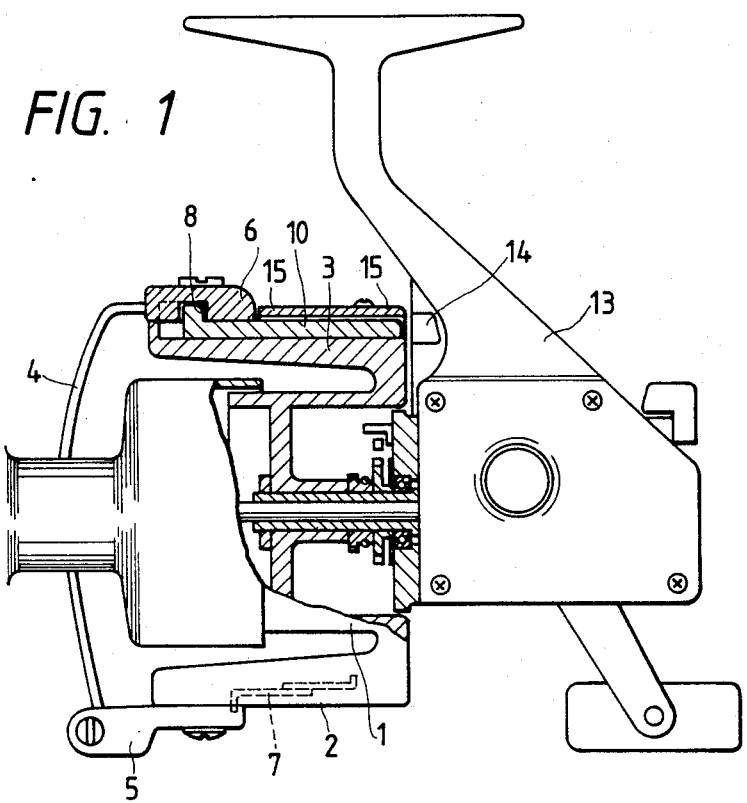
FIG. 1 shows a cutaway side view of the bail inverter of the first embodiment of the present invention.
Figure 2:
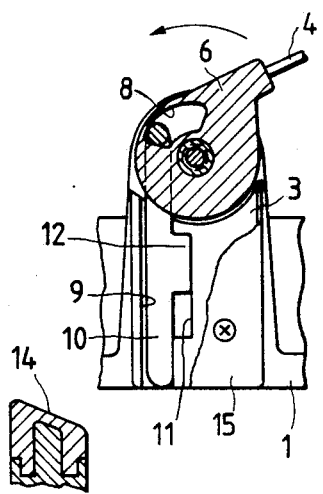
FIG. 2 shows a cutaway plan view of a major part of the bail inverter of the present invention in a fishline winding position.
Figure 3:
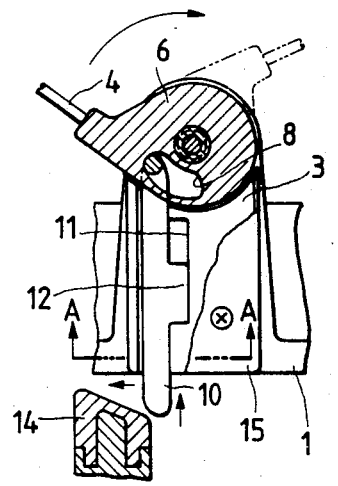
FIG. 3 shows a cutaway plan view of the major part of the bail inverter of the present invention in a fishline unwinding position.
Figure 4:
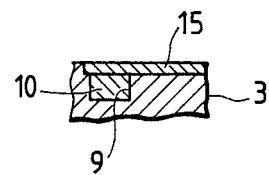
FIG. 4 shows a sectional view of the major part of the bail inverter of the present invention along a line A—A.

The preferred embodiments of the present device is hereinafter described with reference to the drawings attached hereto wherein like references represent like parts throughout.

FIGS. 1, 2, 3 and 4 depict a first embodiment of the bail inverter for a spinning fishing reel of the present invention. Bail support members 5 and 6 are provided at both the ends of a bail 4 and are attached to the front ends of bail support arms 2 and 3 which are provided in mutually opposite positions on the rotor 1 of the spinning reel. A spring 7 is provided in one bail support arm 2. Spring 7 urges the bail support members 5 and 6 so that the members 5 and 6 are moved into fishline winding or fishline unwinding positions beyond dead center. An arc-shaped slender opening 8 is provided in the peripheral portion of the bail support member 6 attached to the other bail support arm 3.

The front end of an operating rod 10 which fits in the sliding groove 9 of one side portion of the bail support arm 3 is engaged in the slender opening 8 of the bail support member 6. The rear end of operating rod 10 is movable so that it can protrude from the bail support arm 3. When the bail support member 6 is located in the fishline winding position beyond the dead center by the urging force of the spring 7, the front end of the operating rod 10 is slid forward at one end of the slender opening 8 by the bail support member and the rear end of the operating rod does not protrude from the bail support arm 3. When the bail support member 6 is located in the fishline unwinding position beyond the dead center by the urging force of the spring 7, the front end of the operating rod 10 is pushed backward at the other end of the slender opening 8 by the bail support member 5 and the rear end of the operating rod 10 protrudes from that of the bail support arm 3.

A portion on one side of the operating rod 10 is provided with a restrictive projection 12 engaged in the restrictive recess 11 of the bail support arm 3 to restrict the quantity of the protrusion of the operating rod from the bail support arm and the amount of forward sliding of the operating rod. The body 13 of the spinning reel is provided with a contact member 14, which is brought into contact with the protruded operating rod 10 to slide the rod forward. It is preferable to make the contact member 14 of a resin or a metal which has a small coefficient of friction.

A cover 15 is secured to the bail support arm 3.

Figure 5:
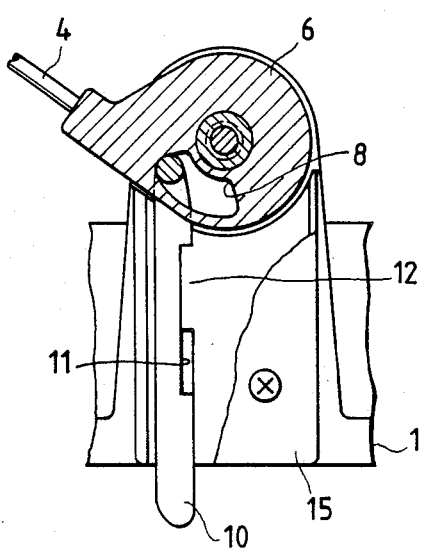
FIG. 5 shows a cutaway plan view of a major part of a second embodiment of the bail inverter of the present invention in a fishline unwinding position.

FIG. 5 shows a second embodiment of the bail inverter for the spinning fishing reel of the present invention. An operating rod 10 is provided with a restrictive recess 11, and a bail support arm 3 is provided with a restrictive projection 12 engaged in the restrictive recess. The restrictive recess 11 and the restrictive projection 12 cooperate to restrict the forward sliding of the operating rod 10.

In the present invention, the operating rod 10 can be efficiently held by the urging force of spring 7 only when the bail support member 3 is in either a fishline winding position or a fishline unwinding position, so that a fishline is unlikely to be cut off. In addition, the amount of protrusion of the operating rod 10, which is caused as the bail support member 3 is in the fishline unwinding position, is restricted so that a bail can be inverted stably, smoothly and easily. Since the only component part built in the bail support arm 3 is the operating rod 10, the assembly and disassembly of the bail support arm 3 and operating rod 10 is easy and the construction is simple, so that the cost of production thereof is low.

Figure 6:
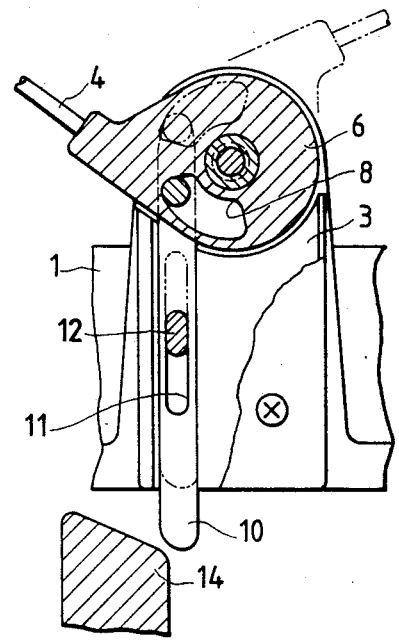
FIG. 6 shows a modification of the invention.

FIG. 6 shows a modification of the foregoing embodiment in which an elongated guide groove 11 is formed in an operating rod 10, and an associated projection 12 is formed in a bail support arm 3, the projection 12 being guided by the elongated guide groove 11.

While the present invention has been described in connection with what is presently considered to be the most practical and preferred embodiments, it is to be understood that the invention is not limited to the disclosed embodiments but, on the contrary is intended to cover various modifications and equivalent arrangements included within the spirit and scope of the appended claims.

What is claimed is:

1. A fishing reel comprising:
   a reel body;
   a rotor attached to said reel body;
   a bail having first and second ends;
   first and second bail support members connected to said bail at its first and second ends respectively, said first bail support member including an arcuate elongated groove formed therein;
   an operating means including an operating rod slidable in a longitudinal direction, said operating means being disposed to be moved between a first and second position and including means for engaging said first bail support member for moving said bail between a fishline winding position and a fishline unwinding position in response to said operating means being moved between said first and second positions, said engaging means conprising a projection on said rod engaged with said arcuate elongated groove;
   means for connecting said first and second bail support members to said rotor, said connecting means including first and second bail support arms, said second bail support arm having a first end connected to said second bail support member and a second end connected to said rotor, said first bail support arm having a first end connected to said first bail support member, a second end connected to said rotor, and a slender opening, said operating rod being disposed in said opening and being slidable therein;
   a contact means for contacting said operating rod and providing an operating force on the operating rod, thereby sliding said operating rod toward said bail, said contacting means being disposed on said reel body;
   a restrictor means for restricting the sliding of said operating rod with respect to said first bail support arm, comprising a projection disposed on said operating rod and a recess disposed in said first bail support arm, said projection being disposed within said recess; and
   a spring means for urging said bail to remain in said fishline winding position when said bail is moved into said fishline winding position, said spring means further urging said bail to remain in said fishline unwinding position when said bail is moved into said fishline unwinding position, said spring means further providing the sole biasing force for urging the operating rod selectively toward its first or second position.

2. A fishing reel comprising:
a reel body;
a rotor attached to said reel body;
a bail having first and second ends;
first and second bail support members connected to said bail at its first and second ends respectively, said first bail support member including an arcuate elongated groove formed therein;
an operating means including an operating rod slidable in a longitudinal direction, said operating means being disposed to be moved between a first and second positiion and including means for engaging said first bail support member for moving said bail between a fishline winding position and a fishline unwinding position in response to said operating means being moved between said first and second positions, said engaging means comprising a first projection on said rod engaged with said arcuate elongated groove;
means for connecting said first and second bail support members to said rotor, said connecting means including first and second bail support arms, said second bail support arm having a first end connected to said second bail support member and a second end connected to said rotor, said first bail support arm having a first end connected to said first bail support member, a second end connected to said rotor, and a slender opening, said operating rod being disposed in said opening and being slidable therein;
a contact means for contacting said operating rod and providing an operating force on the operating rod thereby sliding said operating rod toward said bail, said contacting means being disposed on said reel body;
a restricter means for restricting the sliding of said operating rod with respect to said first bail support arm, comprising a second projection disposed on said bail support arm and a recess, disposed in said operating rod, with said second projection disposed therein; and
a spring means for urging said bail to remain in said fishline winding position when said bail is moved into said fishline winding position, said spring means further urging said bail to remain in said fishline unwinding position when said bail is moved into said fishline unwinding position, said spring means further providing the sole biasing force for urging the operating rod selectively toward its first or second position.

* * * * *